(12) United States Patent
Wu et al.

(10) Patent No.: US 12,156,082 B2
(45) Date of Patent: Nov. 26, 2024

(54) METHOD AND APPARATUS FOR REPORTING ASSISTANT INFORMATION

(71) Applicant: LENOVO (BEIJING) LIMITED, Beijing (CN)

(72) Inventors: Lianhai Wu, Beijing (CN); Jing Han, Beijing (CN); Haiming Wang, Beijing (CN); Xiaodong Yu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 492 days.

(21) Appl. No.: 17/431,074

(22) PCT Filed: Feb. 14, 2019

(86) PCT No.: PCT/CN2019/075107
§ 371 (c)(1),
(2) Date: Aug. 13, 2021

(87) PCT Pub. No.: WO2020/164065
PCT Pub. Date: Aug. 20, 2020

(65) Prior Publication Data
US 2022/0141732 A1   May 5, 2022

(51) Int. Cl.
*H04W 36/00* (2009.01)
*H04W 36/08* (2009.01)

(52) U.S. Cl.
CPC ... *H04W 36/0077* (2013.01); *H04W 36/0064* (2023.05); *H04W 36/087* (2023.05)

(58) Field of Classification Search
CPC ............. H04W 36/0077; H04W 36/08; H04W 36/0009; H04W 36/0033; H04W 88/085; H04W 36/0055
See application file for complete search history.

(56) References Cited

U.S. PATENT DOCUMENTS

| | | | |
|---|---|---|---|
| 2010/0210268 A1* | 8/2010 | Lim ...................... | H04W 48/08 455/436 |
| 2013/0183971 A1 | 7/2013 | Tamaki et al. | |
| 2015/0311926 A1* | 10/2015 | Eliaz .................... | H04B 1/3833 375/297 |
| 2019/0053120 A1* | 2/2019 | Park ...................... | H04W 76/27 |
| 2020/0252847 A1* | 8/2020 | Park ...................... | H04W 80/02 |
| 2021/0176692 A1* | 6/2021 | Rugeland .............. | H04W 76/11 |

(Continued)

FOREIGN PATENT DOCUMENTS

| | | |
|---|---|---|
| CN | 107852363 A | 3/2018 |
| CN | 109275177 A | 1/2019 |

(Continued)

OTHER PUBLICATIONS

International Searching Authority, "Written Opinion of the International Searching Authority," PCT/CN2019/075107, Nov. 7, 2019, pp. 1-3.

(Continued)

*Primary Examiner* — Khoa Huynh
(74) *Attorney, Agent, or Firm* — Kunzler Bean & Adamson

(57) ABSTRACT

The present disclosure relates to methods and apparatuses. According to some embodiments of the disclosure, a method includes: receiving at a base station, assistant information for reestablishing a link for at least one access node associated with an integrated access and backhaul node.

20 Claims, 16 Drawing Sheets

(56) References Cited

U.S. PATENT DOCUMENTS

2021/0227435 A1* 7/2021 Hsieh .................. H04W 36/087
2021/0337432 A1* 10/2021 Lee .................. H04W 36/0016

FOREIGN PATENT DOCUMENTS

WO  WO-2011020487 A1 * 2/2011  ........... H04L 63/104
WO  WO-2017194011 A1 * 11/2017  ........... H04L 63/104

OTHER PUBLICATIONS

Vivo, IAB Topology and Routing Management, 3GPP TSG-RAN WG2 Meeting #103, R2-181178, Aug. 20-24, 2018, pp. 1-4, Gothenburg, Sweden.

ITRI, Service Interruption Minimization during Topology Adaptation, 3GPP TSG-RAN WG2 Meeting #104, R2-1817990, Nov. 12-16, 2018, pp. 1-6, Spokane, US.

LG Electronics Inc., Inter-donor topology adaptation for architecture 1a, 3GPP TSG-RAN WG3 #102, R3-186751, Nov. 12-16, 2018, pp. 1-7, Spokane, WA, USA.

Nokia, Nokia Shanghai Bell, IAB node discovery and monitoring, 3GPP TSG-RAN WG2 Meeting #103bis, R2-1814997, Oct. 8-12, 2018, pp. 1-7, Chengdu, China.

* cited by examiner

METHOD AND APPARATUS FOR REPORTING ASSISTANT INFORMATION

TECHNICAL FIELD

The present disclosure generally relates to wireless communication technology, and more particularly assistant information reporting in a wireless communication system.

BACKGROUND

A wireless communication system may include a base station (hereinafter referred to as "BS") which is in communication with a user equipment (hereinafter referred to as "UE"). UE may include a mobile device (e.g., a cell phone, a tablet, a laptop, an internet-of-things (IoT) device, etc.). Quality of a communication link or channel between a BS and a UE may deteriorate due to various factors, for example but is not limited to, blockage by building(s), relatively long distance between the BS and the UE, etc. One of several solutions to resolve this problem may include deployment of relay nodes (hereinafter referred to as "RNs") in the wireless communication system to enhance and/or expand coverage of the BS, as disclosed in the 3rd Generation Partnership Project (3GPP).

A BS, which communicates with a UE through one or more RNs, is called a donor BS. These RNs together with the donor BS form a backhaul link allowing the UE to reach the donor BS through one or more RNs. Signals from the UE may also be simply transmitted from one RN directly to the donor BS. An Integrated Access and Backhaul (hereinafter referred to as "IAB") architecture, which is evolved from RNs deployment in 3GPP, is being developed to support multi-hop relay in a New Radio (NR) communication network.

Nevertheless, the backhaul link may fail in certain conditions, and therefore a new solution is required to secure data or signal transmission.

SUMMARY OF THE DISCLOSURE

An embodiment of the present disclosure provides a method, including: receiving, at a base station, assistant information for reestablishing a link for at least one access node associated with an integrated access and backhaul node.

Another embodiment of the present disclosure provides a method, including: transmitting a handover request message for an integrated access and backhaul node, wherein the handover request message includes assistant information for reestablishing a link for at least one access node associated with the integrated access and backhaul node.

Yet another embodiment of the present disclosure provides a method, including: transmitting assistant information for reestablishing a link for at least one access node associated with an integrated access and backhaul node, wherein the assistant information is transmitted via F1 signaling.

Yet another embodiment of the present disclosure provides a method, including: transmitting a message including assistant information for handing over an access node associated with an integrated access and backhaul node.

Yet another embodiment of the present disclosure provides a method, including: receiving a message including assistant information for handing over an access node.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the computer executable instructions are programmed to implement a method according to an embodiment of the present disclosure with the at least one receiving circuitry, the at least one transmitting circuitry and the at least one processor.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
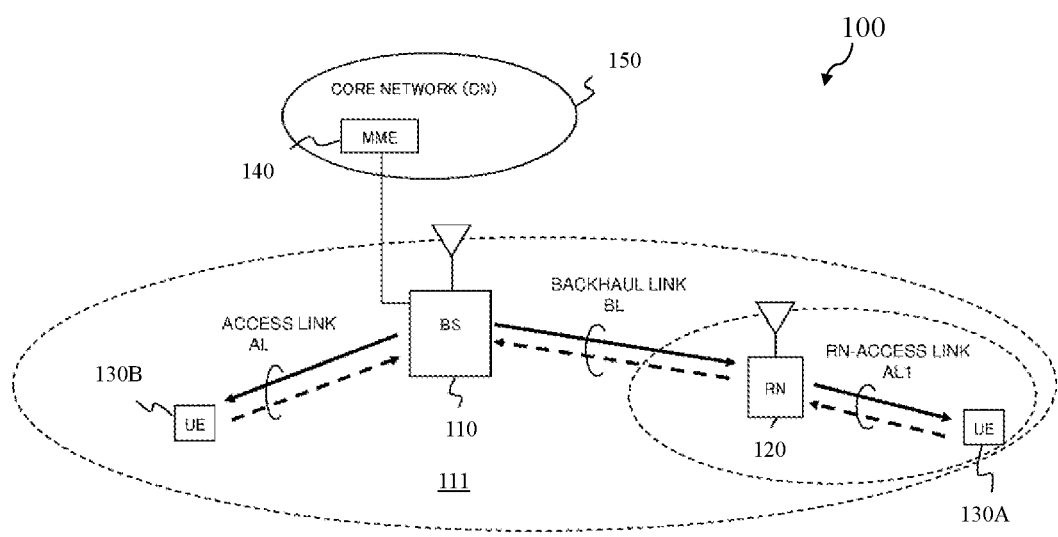
FIG. 1 illustrates a schematic wireless communication system according to an embodiment of the present disclosure.

FIG. 1 illustrates a wireless communication system 100 according to an embodiment of the present disclosure.

Referring to FIG. 1, a wireless communication system 100 includes some nodes (e.g., BS 110 and RN 120) and some UEs (e.g., UE 130A and UE 130B). Although, for simplicity, merely two nodes are illustrated in FIG. 1, it is contemplated that wireless communication system 100 may also include more or fewer nodes in some embodiments of the present disclosure. Although, for simplicity, merely two UEs are illustrated in FIG. 1, it is also contemplated that wireless communication system 100 may include more or fewer UEs in some embodiments of the present disclosure.

The BS 110, which communicates with a Core Network (CN) 150, may operate or work under the control of a Mobility Management Entity (MME) 140. The core network may include a Home Subscriber Server (HSS) (not shown), which communicatively coupled with the MME. The BS 110 may operate, for example based on the standard protocol such as Long-Term Evolution (LTE), LTE-Advanced (LTE-A), New Radio (NR), or other suitable protocol(s). For example, the BS 110 may include an eNB or a gNB, and may define one or more cells (e.g., cell 111). The RN 120 may include a relay node or an integrated access and backhaul node (IAB node). UE 130A may include, for example but is not limited to, a computing device, a wearable device, a mobile device, an IoT device, etc. UE 130B may include a device that is the same or similar to UE 130A. UE 130B may also include device different from UE 130A. Persons skilled in the art should understand that as technology develops and advances, the terminologies described in the present disclosure may change, but should not affect or limit principle and spirit of the present disclosure.

BS 110 (or Donor BS) may establish radio connections to UE 130B and RN 120 through an Access Link (AL) and a Backhaul Link (BL) based on protocol Layer-1 (Physical Layer) to Layer-3 (Radio Resource Control (RRC) Layer), respectively.

In some embodiments of the present disclosure, RN 120 may establish a radio connection to UE 130A through a RN-access link (AL1) based on protocol Layer-1 to Layer-3. In some other embodiments of the present disclosure, the RN 120 may establish a radio connection to the UE 130A through the AL1 based on protocol Layer-1 to Layer-2.

Although FIG. 1 merely shows that the Donor BS 110 is connected to a single UE for simplicity, it is contemplated that the Donor BS 110 may provide or establish connections to multiple UEs. Similarly, although FIG. 1 merely shows that the RN 120 is connected to a single UE for simplicity, it is contemplated that the RN 120 may also provide or establish connections to multiple UEs.

Deployment of RN(s) helps to enhance and/or extend coverage of a BS by a backhaul link. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e., the BL, also referred to as the Un interface. The radio interface that provides radio protocol connection between RN and the UE is referred to as the Uu interface. Relay function and use of RN/DeNB entities in a network is transparent to the operations of the connected UEs.

As mentioned above, 3GPP is envisioning an IAB architecture for the 5G (NR) communication networks supporting multi-hop relays. In other words, an IAB node may hop through one or more IAB nodes before reaching the IAB Donor. Single hop may be considered a special case of multiple hops. Multi-hop backhauling is relatively beneficial because it provides relatively great coverage extension than single-hop backhauling. In a relatively high frequency radio communication system (e.g., radio signals transmitted in frequency bands over 6 GHz), relatively narrow or less signal coverage may benefit from multi-hop backhauling technique. Multi-hop backhauling further enables backhauling around obstacles, e.g., buildings in urban environments for in-clutter deployments.

The maximum number of hops in RN deployment may depend on various factors, for example but is not limited to, frequency, cell density, propagation environment, traffic load, or other factors. These factors are expected to change over time. Therefore, from the perspective of the network architecture, it is desirable to ensure the flexibility in hop count. On the other hand, as the number of hops increases, scalability issues may arise. For example, performance may degrade or network load may increase to an unacceptable level.

Figure 2:
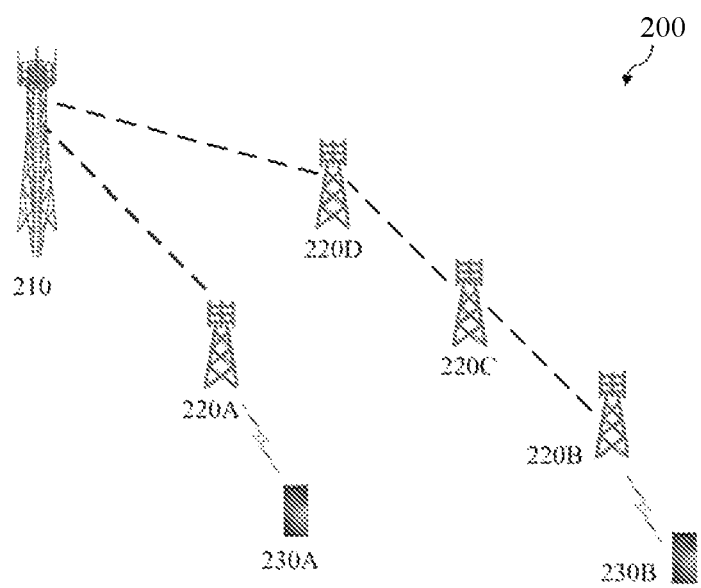
FIG. 2 illustrates a schematic wireless communication system according to an embodiment of the present disclosure.

FIG. 2 illustrates a wireless communication system 200 according to an embodiment of the present disclosure.

Referring to FIG. 2, it is assumed for simplicity that the wireless communication system 200 includes a Donor node (e.g., IAB Donor 210), some IAB nodes (e.g., IAB node 220A, IAB node 220B, IAB node 220C, and IAB node 220D), and some UEs (e.g., UE 230A and UE 230B). Although merely, for simplicity, one Donor node is illustrated in FIG. 2, it is contemplated that wireless communication system 200 may include more Donor node(s) in some embodiments of the present disclosure. Similarly, although merely four IAB nodes are illustrated in FIG. 2 for simplicity, it is contemplated that wireless communication system 200 may include more or fewer IAB nodes in some embodiments of the present disclosure. Although merely two UEs are illustrated in FIG. 2 for simplicity, it is contemplated that wireless communication system 200 may include more or fewer UEs in some embodiments of the present disclosure.

IAB node 220A and IAB node 220D are directly connected to IAB Donor 210. IAB node 220A and IAB node 220D may be connected to different Donor nodes in accordance with some other embodiments of the present disclosure.

IAB node 220C can reach IAB Donor 210 by hopping through IAB node 220D. IAB node 220D is a parent IAB node of IAB node 220C. In other words, IAB node 220C is a child node of IAB node 220D. IAB node 220B can reach IAB Donor 210 by hopping through IAB node 220C and IAB node 220D. IAB node 220C and IAB node 220D are upstream nodes of IAB node 220B, and IAB node 220C is a parent IAB node of IAB node 220B. In other words, IAB node 220B is the child node of IAB node 220C. IAB node 220B and IAB node 220C are downstream nodes of IAB node 220D. UE 230A is directly connected to IAB node 220A, and UE 230B is directly connected to IAB node 220B. In other words, UE 230A and UE 230B are served by IAB node 220A and IAB node 220B, respectively.

Each of IAB node 220A, IAB node 220B, IAB node 220C, and IAB node 220D may be directly connected to one or more UE(s) in accordance with some other embodiments of the present disclosure.

Each of IAB node 220A, IAB node 220B, IAB node 220C, and IAB node 220D may be directly connected to one or more IAB node(s) in accordance with some other embodiments of the present disclosure.

In the wireless communication system 200, which provides multi-hop relay, a wireless backhaul link may fail due to, for example but is not limited to, blockage by moving object(s) (e.g., vehicle(s)), foliage (caused by seasonal changes), new buildings (e.g., infrastructure changes). Such backhaul link failure may occur on a physically stationary IAB node or a mobile IAB node. Link switching technique has been developed to address this issue.

For example, assuming a Radio Link Failure (RLF) occurs on the backhaul link between IAB Donor 210 and IAB node 220D, IAB node 220D may establish a link to another Donor node (not shown). In other words, IAB node 220D may switch from the link between IAB node 220D and IAB Donor 210 to a link between IAB node 220D and another Donor node (not shown).

For example, assuming a RLF occurs on the backhaul link between two IAB nodes (e.g., IAB node 220D and IAB node 220C), IAB node 220C may establish a link to another IAB node (e.g., IAB node 220A). In other words, IAB node 220C may switch from the link between IAB node 220C and IAB node 220D to a link between IAB node 220C and a candidate IAB node 220A.

Figure 3:
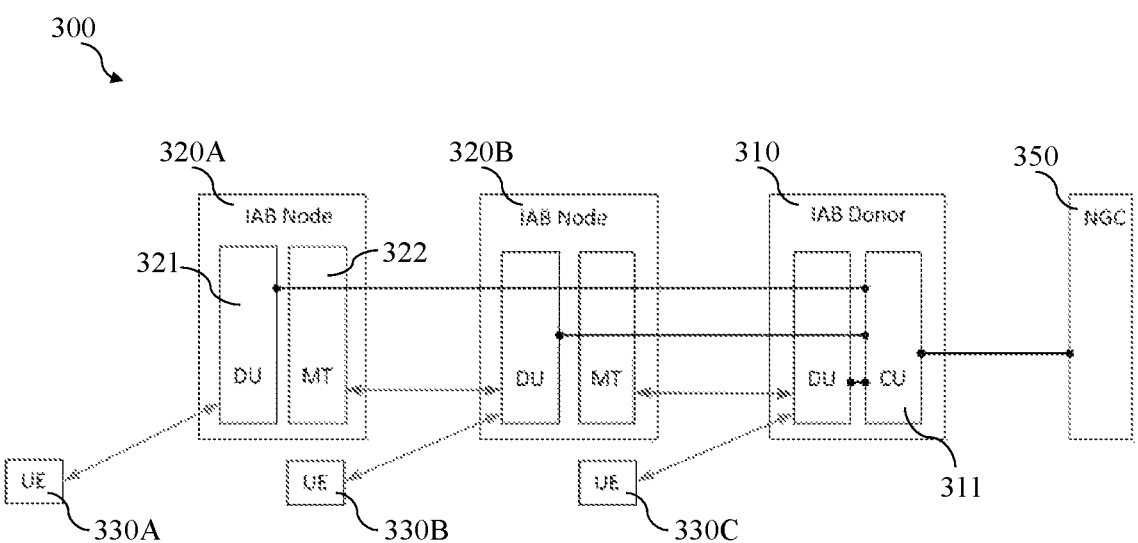
FIG. 3 illustrates a schematic wireless communication system according to an embodiment of the present disclosure.

FIG. 3 illustrates a wireless communication system 300 according to an embodiment of the present disclosure.

Referring to FIG. 3, the wireless communication system 300 may include IAB donor 310, IAB node 320A, IAB node 320B, UE 330A, UE 330B, UE 330C and a Next-Generation Core (NGC) 350.

Each of the IAB node 320A and IAB node 320B may include a Distributed Unit (DU) 321 and a Mobile Termination (MT) 322. In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 320A may be connected to an upstream IAB node 320B via MT 322A function. IAB node 320A may be connected to UE 330A via the DU 321A.

IAB node 320B may be connected to an upstream IAB node or IAB donor 310 via MT 322B function. IAB node 320B may be connected to UE 330B via DU 321B. IAB node 320B may be connected to downstream IAB node 320A via DU 321B.

In some embodiments of the present disclosure, IAB nodes as shown in FIG. 3 may include Layer-2 (L2) IAB nodes.

Referring back to FIG. 2, the IAB nodes (e.g., IAB node 220A, IAB node 220B, IAB node 220C, and IAB node 220D) may include L2 IAB nodes.

Referring to FIG. 3, the BS (e.g., IAB donor 310) may include at least one DU to support UEs and MTs of downstream IAB nodes. A Central Unit (CU) 311 included in the IAB donor 310 controls the DUs of all IAB nodes (e.g., IAB node 320A and IAB node 320B) and the DU resided in the IAB donor 310. The DU(s) and the CU of an IAB donor may be co-located or may be located in different positions. The DU(s) and the CU of the IAB donor are connected via F1 interface. In other words, the F1 interface provides means for interconnecting the CU and the DU(s) of an IAB donor. The F1 Application Protocol (F1AP) supports the functions of F1 interface by certain F1AP signaling procedures.

In some embodiments of the present disclosure, CU 311 of the IAB Donor node 310 is a logical node hosting RRC, Service Data Adaptation Protocol (SDAP) and Packet Data Convergence Protocol (PDCP) layers of the BS. The DU of the BS is a logical node hosting Radio Link Control (RLC) layer, Medium Access Control (MAC) layer and Physical layer (PHY) of the BS. One DU of a BS supports at least one cell. One cell is supported by only one DU of a BS or DU of an IAB node.

Figure 4:
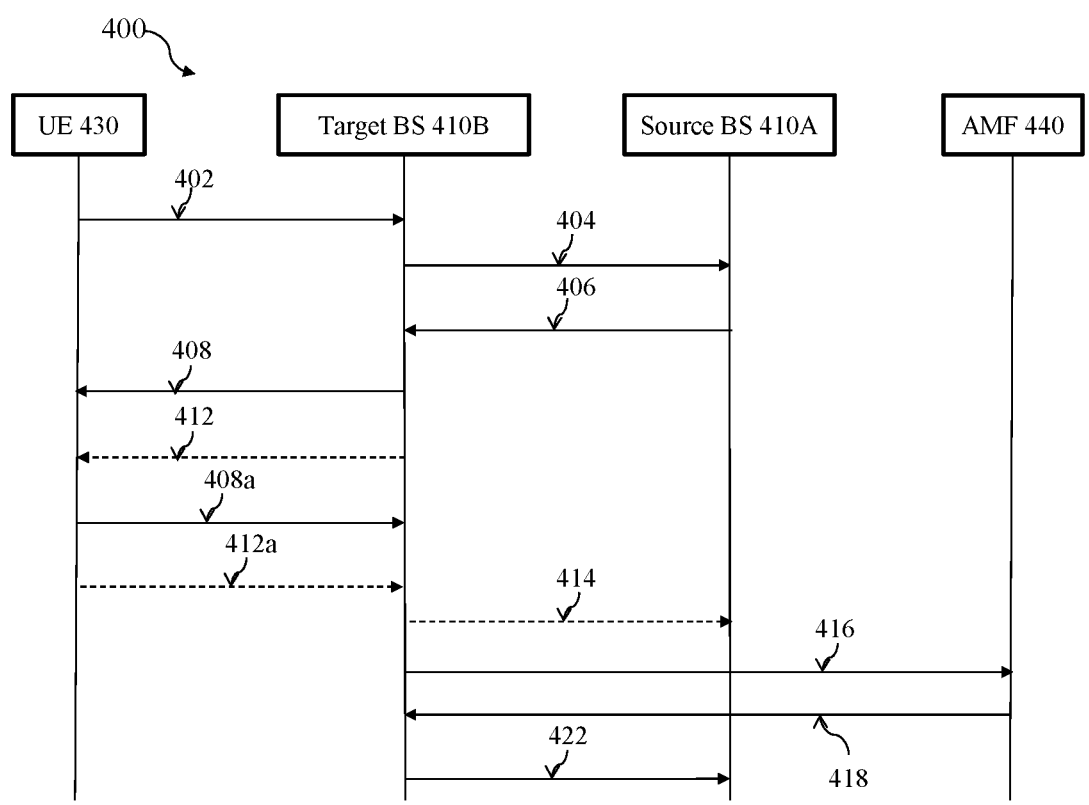
FIG. 4 illustrates a flow chart of an exemplary reestablishment procedure according to an embodiment of the present disclosure.

FIG. 4 illustrates a flow chart of an exemplary reestablishment procedure 400 according to an embodiment of the present disclosure.

The procedure in FIG. 4 may occur in response to a Radio Link Failure (RLF) on a radio link between UE 430 and source BS 410A. The UE 430 may select a target BS (e.g., target BS 410B) to reestablish the radio link. The source BS 410A and the target BS 410B, which communicate with a NGC (not shown), may operate or work under the control of an Access and Mobility Management Function (AMF) 440. For example, the UE 430 may function as UE 330C shown in FIG. 3, the source BS 410A and the target BS 410B may function as IAB donor 310 shown in FIG. 3, and the AMF 440 may function as a part of NGC 350 shown in FIG. 3.

At step 402, the UE 430 may transmit a RRC Reestablishment Request message to the target BS 410B. The RRC Reestablishment Request message may include information that can identify UE 430, such as the Physical Cell ID (PCI) of the source BS 410A and the Cell Radio Network Temporary Identifier (C-RNTI) identifying the UE 430 at the source BS 410A.

At step 404, the target BS 410B may transmit a request to the source BS 410A to retrieve the UE context of the UE 420 if the UE context is not available at the target BS 410B. At step 406, the target BS 410B may transmit the UE context of the UE 420 to the source BS 410A.

In some embodiments of the present disclosure, steps 404 and 406 may be omitted if the UE context of the UE 420 is available at the target BS 410B. For example, the target BS 410B and the source BS 410A may be the same BS. In this example, the UE context of the UE 420 is available at the target BS, and thus steps 404 and 406 are omitted.

At step 408, the target BS 410B may transmit a RRC Reestablishment message to the UE 430. At step 408a, the UE 430 may transmit a RRC Reestablishment Complete message to the target BS 410B.

In some embodiments of the present disclosure, the procedure 400 may further include steps 412 and 412a (denoted by dotted arrow as an option). At step 412, the target BS 410B may transmit a RRC Reconfiguration message to the UE 430. At step 412a, the UE 430 may transmit a RRC Reconfiguration Complete message to the target BS 410B.

In some embodiments of the present disclosure, the procedure 400 may further include step 414 (denoted by dotted arrow as an option). At step 414, the target BS 410B may provide a forwarding address to the source BS 410A. The source BS 410A may transmit the downlink user data buffered in the source BS 410A to the forwarding address to prevent loss of data.

At step 416, the target BS 410B may transmit a Path Switch Request message to the AMF 440. At step 418, the AMF 440 may transmit a Path Switch Response message to the target BS 410B. At step 422, the target BS 410B may transmit a UE context Release message to the source BS 410A to trigger the release of the UE resources associated with the UE 430 at the source BS 410A.

Figure 5:
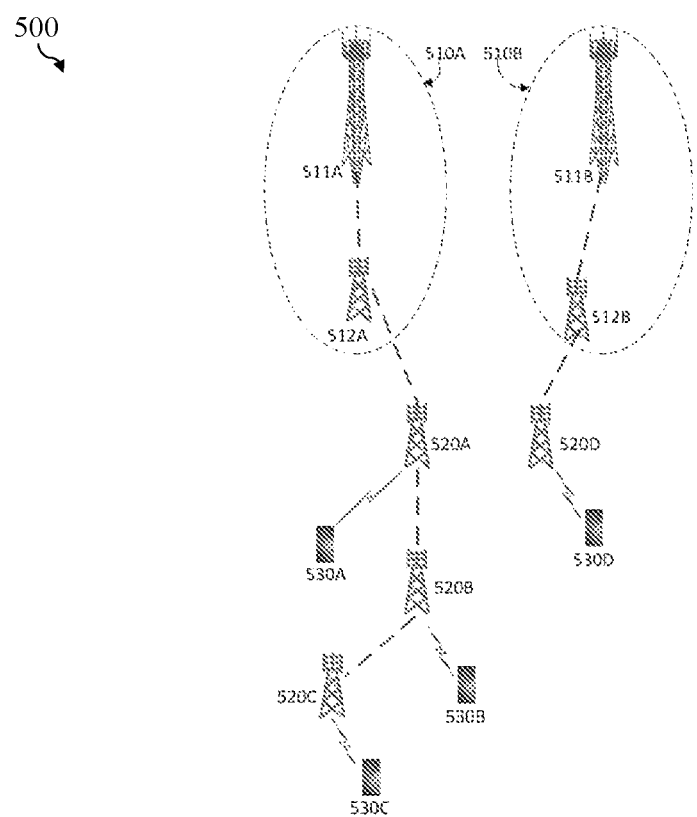
FIG. 5 illustrates a schematic wireless communication system according to an embodiment of the present disclosure.

FIG. 5 illustrates a wireless communication system 500 according to an embodiment of the present disclosure.

Referring to FIG. 5, the wireless communication system 500 may include BSs (e.g., IAB donor 510A and IAB donor 510B), IAB nodes (e.g., IAB node 520A, IAB node 520B, IAB node 520C, and IAB node 520D), and UEs (e.g., UE 530A, UE 530B, UE 530C, and UE 530D). IAB donor 510A may include a CU 511A and a DU 512A, and IAB donor 510B may include a CU 511B and a DU 512B. Although merely two BSs illustrated in FIG. 5 for simplicity, it is contemplated that wireless communication system 500 may include more BS(s) in some embodiments of the present disclosure. Although merely four IAB nodes are illustrated in FIG. 5 for simplicity, it is contemplated that wireless communication system 500 may include more or fewer IAB nodes in some embodiments of the present disclosure. Although merely four UEs are illustrated in FIG. 5 for simplicity, it is contemplated that wireless communication system 500 may include more or fewer UEs in some embodiments of the present disclosure.

The downstream nodes of IAB node 520A (e.g., IAB node 520B and IAB node 520C), and the UEs served by the IAB node 520A, IAB node 520B, and IAB node 520C (e.g., UE 530A, UE 530B, and UE 530C) can reach IAB donor 510A by hopping through IAB node 520A. However, under some circumstances, a RLF may occur on the backhaul link between IAB node 520A and IAB donor 510A. In this scenario, IAB donor 510A may hand over IAB node 520A to a target BS (e.g., IAB donor 510B). After the completion of the handover procedure of IAB node 520A, the downstream nodes of IAB node 520A and the UEs served by these downstream nodes may initialize reestablishment procedure(s). For example, the child node of IAB node 520A (e.g., IAB node 520B) and the UE served by IAB node 520A (e.g., UE 530A) may select one of the IAB node 520A, an IAB node different from the IAB node 520A, or an IAB donor to reestablish the radio link based on, for example, signal strength, respectively. After the reestablishment procedure of IAB node 520B, the child node of IAB node 520B (e.g., IAB node 520C) and the UE served by IAB node 520B (e.g., UE 530B) may perform a similar reestablishment procedure, respectively. Then, the UE served by the IAB node 520C (e.g., UE 530C) may perform a similar reestablishment procedure. Alternatively, as will be described in detail in the following text, instead of performing reestablishment procedure(s), the downstream nodes of IAB node 520A and the UEs served by IAB node 520A and the downstream nodes may be handed over from IAB donor 510A to the target BS (e.g., IAB donor 510B).

Figure 6:
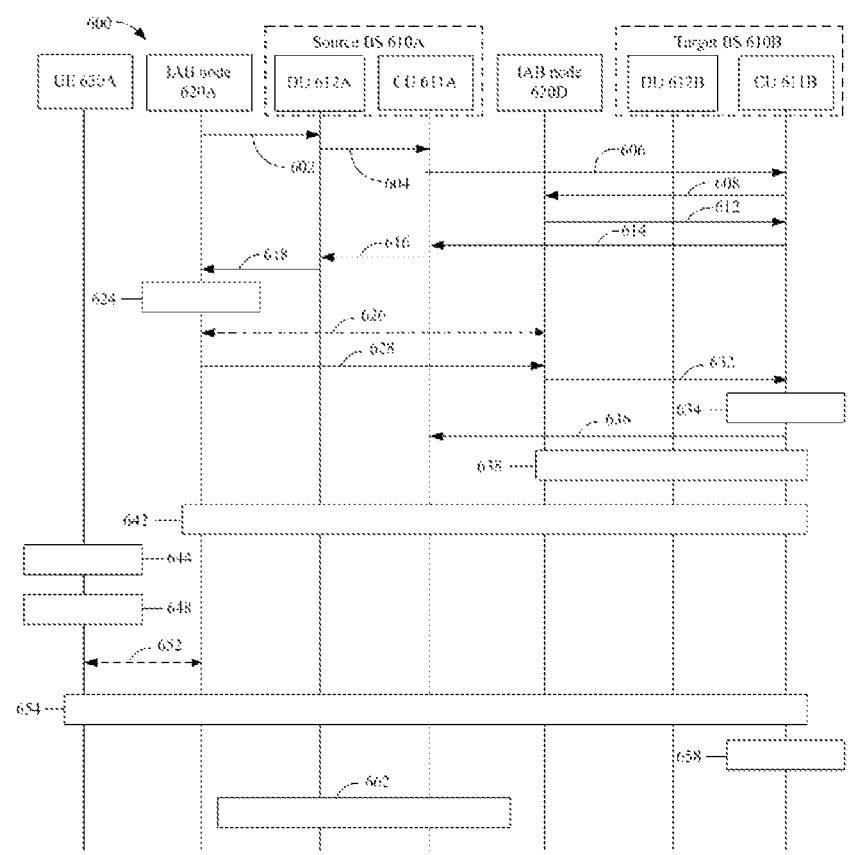
FIG. 6 illustrates a flow chart of an exemplary handover procedure according to an embodiment of the present disclosure.

FIG. 6 illustrates a flow chart of an exemplary handover procedure 600 according to an embodiment of the present disclosure.

In FIG. 6, IAB node 620A and UE 630A are accessing a source BS 610A. IAB node 620D is accessing a target BS 610B. The source BS 610A and the target BS 610B are communicating with a NGC (not shown). The source BS 610A may include a CU 611A and a DU 612A, and the target BS 610B may include a CU 611B and a DU 612B. The IAB node 620A and IAB node 620D may include respective MTs and DUs (not shown). For example, the IAB node 620A may function as IAB node 520A shown in FIG. 5, the UE 630A may function as UE 530A shown in FIG. 5, the IAB node 620D may function as IAB node 520D shown in FIG. 5. The source BS 610A may function as the IAB donor 510A shown in FIG. 5, and the target BS 610B may function as the IAB donor 510B shown in FIG. 5.

At step 602, the IAB node 620A may transmit a message including a measurement report to the DU 612A of the source BS 610A. The measurement report is based on a measurement configuration previously received from the source BS 610A by the IAB node 620. The measurement report may include the signal strength of signals of the serving cell (i.e., the source BS 610A) of the IAB node 620A, and/or the signal strength of signals of all neighboring cells (e.g., the target BS 610B) from which the IAB node 620A can detect a signal.

At step 604, the DU 612A of the source BS 610A may transmit an Uplink RRC Transfer message to the CU 611A of the source BS 610A to convey the measurement report received at step 602. The CU 611A may determine a target cell (e.g., the target BS 610B) based on the measurement report. At step 606, the CU 611A of the source BS 610A may transmit a Handover Request message to the CU 611B of the target BS 610B to initiate a handover preparation procedure for the IAB node 620A.

At step 608, the CU 611B of the target BS 610B may transmit a UE Context Setup Request message to the IAB node 620D to create a UE context and setup one or more bearers for the IAB node 620A. The UE context of an IAB node may also be referred to as MT context of the IAB node. At step 612, the IAB node 620D may transmit a UE Context Setup Response message to the CU 611B of the target BS 610B. At step 614, the CU 611B of the target BS 610B may transmit a Handover Request Acknowledgement (ACK) message to the CU 611A of the source BS 610A.

After receiving the Handover Request ACK message, the CU 611A of the source BS 610A may generate a RRC Reconfiguration message for the MT of the IAB node 620A. At step 616, the CU 611A of the source BS 610A may transmit a Downlink RRC Transfer message to the DU 612A of the source BS 610A. The Downlink RRC Transfer message may include the generated RRC Reconfiguration message. At step 618, the DU 612A of the source BS 610A may forward the received RRC Reconfiguration message to the IAB node 620A. Based on the RRC Reconfiguration message, the IAB node 620A may recognize that it will be handed over to a BS different from the source BS 610A.

At step 622, after receiving the Handover Request ACK message, the CU 611A of the source BS 610A may also transmit an Sequence Number (SN) Status Transfer message to the CU 611B of the target BS 610B. At step 624, the DU of the IAB node 620A may discontinue service to UEs (e.g., UE 630A) and/or to other IAB nodes since it loses connectivity to the CU 611A of the source BS 610A.

In some embodiments of the present disclosure, the procedure 600 may further include step 626 (denoted by dotted arrow as an option). At step 626, the MT of the IAB node 620A may discover the IAB node 620D, and may perform a Random Access Procedure with the IAB node 620D.

At step 628, the MT of the IAB node 620A may transmit a RRC Reconfiguration Complete message to the IAB node 620D. At step 632, the IAB node 620D may transmit an Uplink RRC Transfer message to the CU 611B of the target BS 610B to convey the RRC Reconfiguration Complete message. At step 634, the CU 611B of the target BS 610B may perform a path switch procedure for MT of the IAB node 620A with the NGC (not shown). At step 636, the CU 611B of the target BS 610B may transmit a Context Release message to the CU 611A of the source BS 610A to remove the UE context of the IAB node 620A at the source BS 610A. The Context Release message may indicate the completion of the handover of the MT of the IAB node 620A.

At step 638, the CU 611B of the target BS 610B may configure a new adaptation layer route on the wireless backhaul between the migrating IAB node and the DU of the target BS, i.e., the DU 612B of the target BS 610B↔the IAB node 620D↔the IAB node 620A.

At step 642, the IAB node 620A may perform a DU setup procedure and may establish a connection with the CU 611B of the target BS 610B. During this procedure, the DU of the IAB node 620A may obtain a new configuration, such as a new PCI, from the CU 611B of the target BS 610B. The DU of the IAB node 620A having the new PCI may also be referred to as the new DU of the IAB node 620A, while the DU of the IAB node 620A having the old PCI may be referred to as the old DU of the IAB node 620A. After the DU setup procedure, the DU of the IAB node 620A may resume service to UEs and/or to other IAB nodes.

At step 644, the UE 630A may discover RLF on the link between the UE 630A and the old DU of the IAB node 620A. At step 648, the UE 630A may discover and select the new DU of the IAB node 620A or any other DU.

In some embodiments of the present disclosure, the procedure 600 may further include step 652 (denoted by dotted arrow as an option). At step 652, the UE 630A may perform a random access procedure with the selected DU (e.g., the new DU of the IAB node 620A).

At step 654, the UE 630A and the CU 611B of the target BS 610B may perform a RRC Connection Reestablishment procedure via the IAB node 620A. At step 658, the CU 611B of the target BS 610B may perform a path switch procedure for the UE 630A with the NGC (not shown).

At step 662, the CU 611A of the source BS 610A may release the old adaptation layer route, i.e., the DU 612A of the source BS 610A↔the IAB node 620A.

The downstream nodes of the IAB node 620A and the UEs served by these downstream nodes may also perform the reestablishment procedure as described above with respect to step 654 of FIG. 6. For example, assuming the IAB node 620A has a child IAB node 620B and a UE 630B served by the IAB node 620B. The reestablishment procedure as described above with respect to step 654 of FIG. 6 may be performed by the IAB node 620B and the UE 630B.

Alternatively, as will be described in detail in the following text, instead of performing reestablishment procedure(s), the downstream nodes of the IAB node 620A and the UEs directly or indirectly connected to the IAB node 620A may be handed over from the source BS 610A to a target BS (e.g., the target BS 610B).

It is desirable to optimize the handover procedure of an IAB node from a source BS to a target BS. It is also desirable to optimize the subsequent procedures (e.g., reestablishment procedures or handover procedures) of the access nodes associated with the IAB node. The access nodes associated with the IAB node may include downstream nodes of the IAB node and the UEs served by the IAB node and the downstream nodes of the IAB node.

In particular, in order to successfully perform the subsequent procedures of the access nodes associated with the IAB node, the target BS may need to obtain their UE context. Therefore, a procedure of informing the target BS of the UE context of these access nodes is desirable.

Embodiments of the present disclosure propose technical solutions for reporting assistant information for facilitating the above-mentioned handover and reestablishment procedures. More details on the embodiments of the present disclosure will be illustrated in the following text in combination with the appended drawings.

Figure 7A:
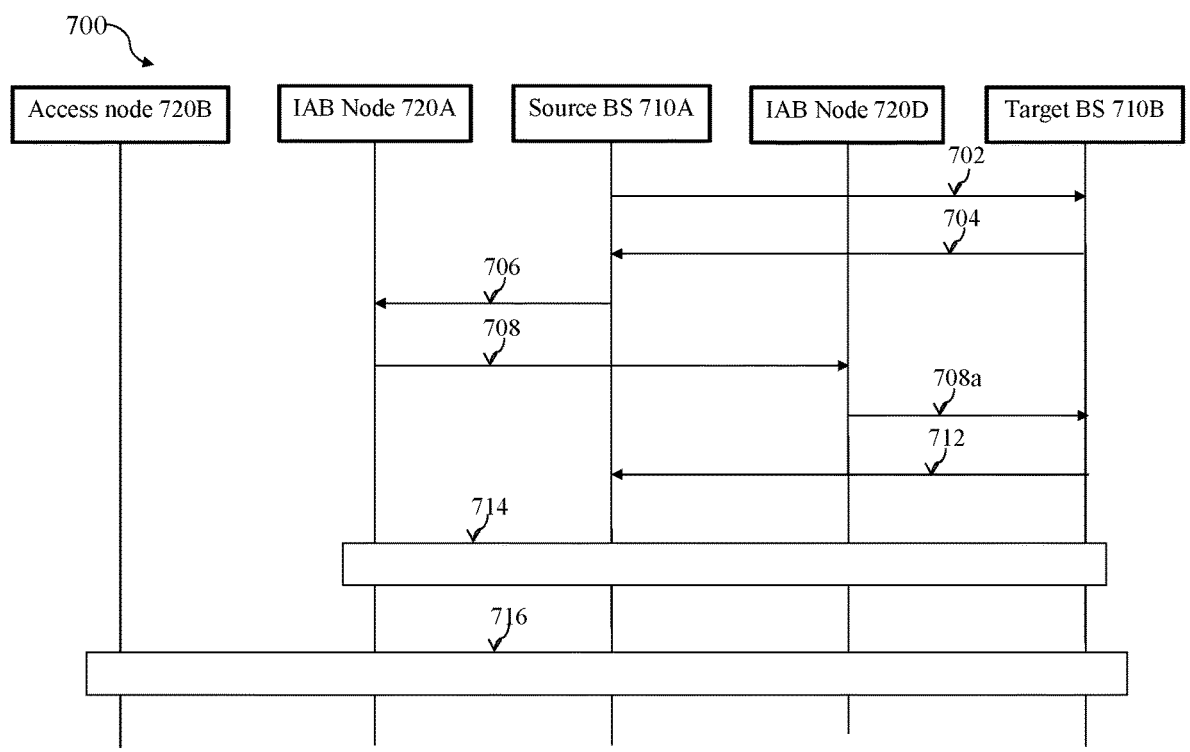
FIG. 7A shows a flow chart of an exemplary handover procedure according to an embodiment of the present disclosure.

FIG. 7A shows a flow chart of an exemplary handover procedure 700 according to an embodiment of the present disclosure.

In FIG. 7A, IAB node 720A is accessing a source BS 710A. Access node 720B is a downstream node of IAB node 720A, a UE served by IAB node 720A, or a UE served by one of the downstream nodes of IAB node 720A. In other words, the access node 720B is accessing the source BS 710A via the IAB node 720A. IAB node 720D is accessing a target BS 710B. The IAB node 720A and IAB node 720D may include respective MTs and DUs (not shown).

For example, the IAB node 720A may function as IAB node 520A shown in FIG. 5, and the IAB node 720D may function as IAB node 520D shown in FIG. 5. The access node 720B may function as one of IAB node 520B, IAB node 520C, UE 530A, UE 530B, and UE 530C shown in FIG. 5. The source BS 710A may function as the IAB donor 510A shown in FIG. 5, and the target BS 710B may function as the IAB donor 510B shown in FIG. 5.

The procedure 700 includes three phases, i.e., Phase 1: a handover procedure for MT of IAB node 720A; Phase 2: a DU setup procedure for IAB node 720A; and Phase 3: a reestablishment procedure for the access node 720B. Phase 1 is described with respect to steps 702-712, Phase 2 is described with respect to step 714, and Phase 3 is described with respect to step 716.

At step 702, the source BS 710A may initiate a handover procedure of an IAB node (e.g., IAB node 720A) to a target cell (e.g., the target BS 710B). For example, the source BS 710A may transmit a Handover Request message to the target BS 710B to initiate a handover preparation procedure for the IAB node 720A. In some embodiments, the Handover Request message may include the UE context of the IAB node 720A. In some embodiments, the Handover Request message may include assistant information for reestablishing a link for at least one access nodes associated with the IAB node 720A (e.g., access node 720B).

In some embodiments of the present disclosure, the assistant information may include the UE context of all downstreaming nodes of the IAB node 720A, the UE context of all UEs connected to the IAB node 720A, and the UE context of all UEs connected to the downstreaming nodes of the IAB node 720A. For example, the assistant information may include the UE context of the access node 720B.

For example, referring back to FIG. 5, the CU 511A of the IAB donor 510A may transmit assistant information for reestablishing a link for the access nodes associated with the IAB node 520A to the CU 511B of the IAB donor 510B. The assistant information may include the UE context of IAB node 520B and IAB node 520C, and the UE context of UE 530A, UE 530B, and UE 530C.

In some embodiments of the present disclosure, the assistant information may indicate a cell identity of the IAB node 520A. The cell identity of the IAB node 520A may be a PCI of the IAB node 520A.

In some embodiments of the present disclosure, the assistant information may be included in an information element (IE) for UE context information in the Handover Request message. In some embodiments of the present disclosure, the assistant information may be included in a new IE in the Handover Request message.

In some embodiments of the present disclosure, the Handover Request message may indicate an identity of the DU of the IAB node 520A. The Handover Request message may indicate respective identities of the DUs of the downstream nodes of the IAB node 520A. For example, the assistant information may indicate the identities of the DUs of the IAB node 520A, the IAB node 520B and the IAB node 520C. An identity of a DU may be a DU ID. By indicating the identity of the DU of a downstream node, the CU of the target BS (e.g., CU 511B of the IAB donor 510B) may recognize that the downstream node is an IAB node.

Referring to FIG. 7A, at step 704, the target BS 710B may perform admission control and may transmit a Handover Request ACK message including RRC configuration to the source BS 710A. At step 706, the source BS 710A may transmit to the IAB node 720A a RRC Reconfiguration message for the MT of the IAB node 720A.

After receiving the RRC Reconfiguration message, the IAB node 720A may move the RRC connection to the target BS 710B and may transmit a Handover Complete message in reply. Specifically, at step 708, the IAB node 720A may transmit a RRC Reconfiguration Complete message to a target IAB node (e.g., IAB node 720D). At step 708*a*, the IAB node 720D may forward the Reconfiguration Complete message to the target BS 710B. At step 712, the target BS 710B may transmit a Context Release message to the source BS 710A to remove the UE context of the IAB node 720A at the source BS 710A.

At step 714, the IAB node 720A may perform a DU setup procedure and may establish a connection with the CU of the target BS 710B.

In some embodiments of the present disclosure, during the DU setup procedure, information indicating an identity of the MT of the IAB node 720A may be transmitted to the target BS 710B. The identity of a MT may be a MT ID.

In some embodiments of the present disclosure, instead of providing the assistant information in the Handover Request message, the assistant information may be transmitted via F1 signaling after the completion of the setup of the DU of the IAB node 720A. In some embodiments of the present disclosure, the assistant information may be transmitted during the DU setup procedure.

In some embodiments of the present disclosure, the assistant information may include the UE context of all downstreaming nodes of the IAB node 720A, the UE context of all UEs connected to the IAB node 720A, and the UE context of all UEs connected to the downstreaming nodes of the IAB node 720A.

In some embodiments of the present disclosure, the assistant information may indicate a cell identity of the IAB node 720A. The cell identity of the IAB node 720A may be a PCI of the IAB node 720A.

After the completion of the setup of the DU of the IAB node 720A, the IAB node 720A may resume service to UEs and/or to IAB nodes, and may be discovered for link reestablishment. For example, the IAB node 720B may discover and select the IAB node 720A to reestablish a radio link. At step 716, the IAB node 720B may perform a reestablishment procedure with the IAB node 720A. The reestablishment procedure will be described in detail in the following text with respect to FIGS. 7B and 7C.

Figure 7B:
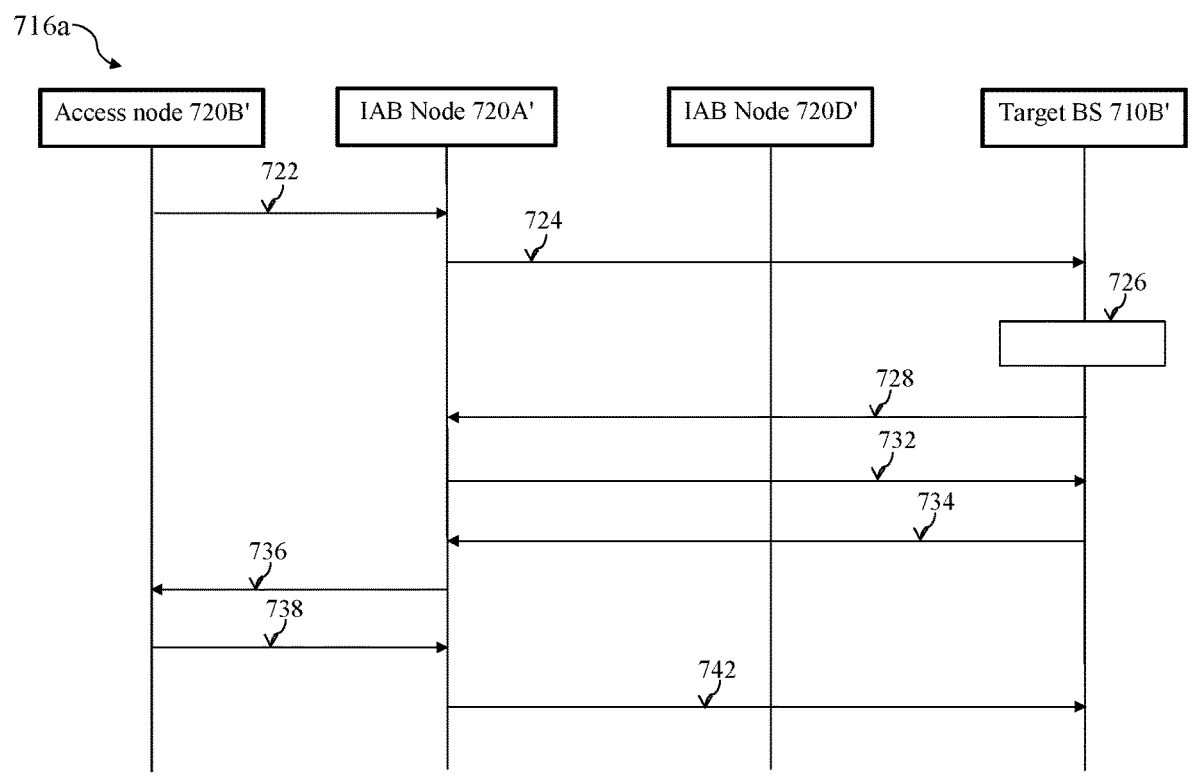
FIG. 7B shows a flow chart of an exemplary reestablishment procedure according to an embodiment of the present disclosure.
Figure 7C:
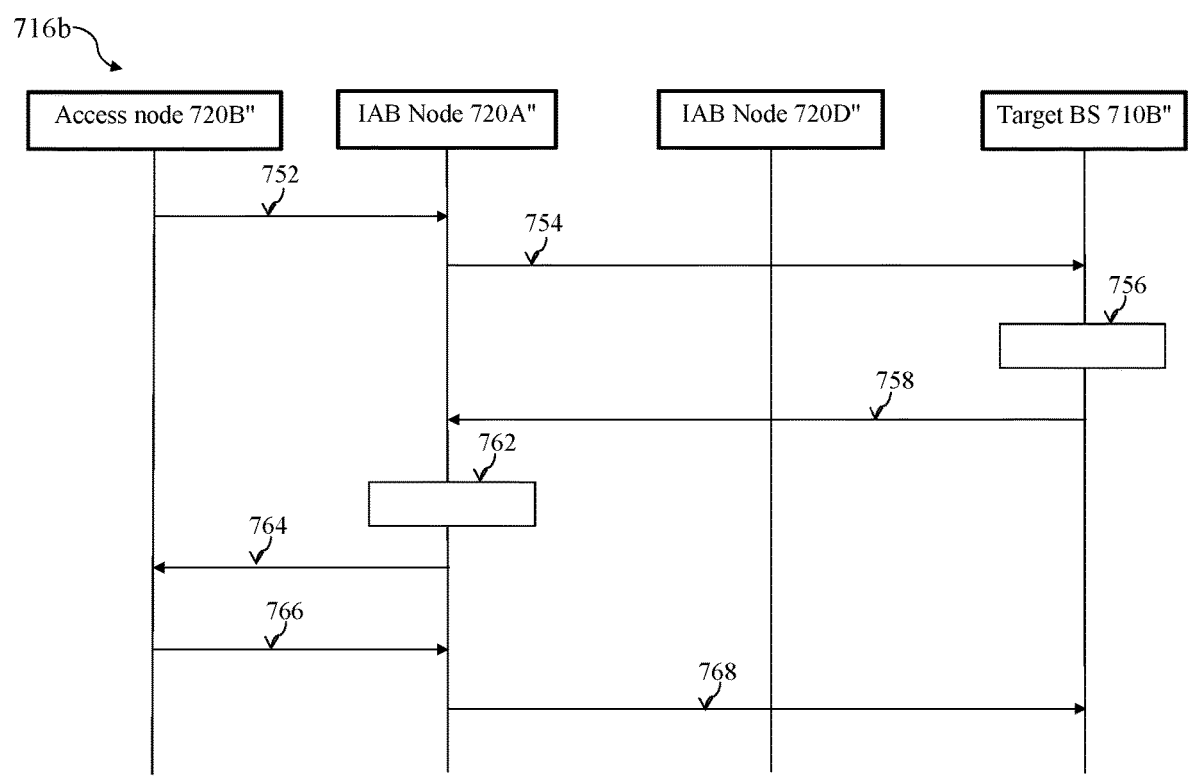
FIG. 7C shows a flow chart of an exemplary reestablishment procedure according to another embodiment of the present disclosure.

FIG. 7B shows a flow chart of an exemplary reestablishment procedure 716*a* according to an embodiment of the present disclosure. FIG. 7C shows a flow chart of an exemplary reestablishment procedure 716*b* according to another embodiment of the present disclosure.

In FIG. 7B, IAB node 720A' is accessing a target BS 710B' via IAB Node 720D', and access node 720B' may select the IAB node 720A' to reestablish a radio link. For example, IAB node 720A' may function as IAB node 520A shown in FIG. 5, the IAB node 720D' may function as IAB node 720D shown in FIG. 5, the target BS 710B' may function as the IAB donor 510B shown in FIG. 5, and the access node 720B' may function as IAB node 520B or UE 530A shown in FIG. 5.

In FIG. 7C, IAB node 720A" is accessing a target BS 710B" via IAB Node 720D", and access node 720B" may select the IAB node 720A" to reestablish a radio link. For example, IAB node 720A" may function as IAB node 520A shown in FIG. 5, the IAB node 720D" may function as IAB node 720D shown in FIG. 5, the target BS 710B" may function as the IAB donor 510B shown in FIG. 5, and the access node 720B" may function as IAB node 520B or UE 530A shown in FIG. 5.

In some embodiments of the present disclosure, the procedure 716*a* or 716*b* may occur after step 714 in FIG. 7A, in place of step 716. In some embodiments of the present disclosure, the procedure 716*a* or 716*b* may occur after step 648 or 652 in FIG. 6, in place of step 654.

Referring back to FIG. 7A, the procedure 716*a* in FIG. 7B may occur in place of step 716 in FIG. 7A in the case that the assistant information includes the UE context of the downstreaming nodes of the IAB node 720A and the UE context of the UEs directly or indirectly connected to the IAB node 720A. The procedure 716*b* in FIG. 7C may occur in place of step 716 in FIG. 7A in the case that the assistant information indicates a cell identity of the IAB node 720A.

Referring to FIG. 7B, at step 722, the access node 720B' may transmit a RRC Connection Reestablishment Request message to IAB node 720A'. In some embodiments, the RRC Connection Reestablishment Request message may indicate an old identity of the access node 720B' and an old identity of a source serving cell of the access node 720B'. For example, the RRC Connection Reestablishment Request message may include an old C-RNTI of the access node 720B' and an old PCI of a source serving cell of the access node 720B' (e.g., the old PCI of IAB node 720A').

In some embodiments, in the case that the access node 720B' is an IAB node, the RRC Connection Reestablishment Request message may indicate an identity of the DU of the access node 720B'.

At step 724, the IAB node 720A' may transmit an initial Uplink RRC Transfer message to the target BS 710B' to convey the RRC Connection Reestablishment Request message. The initial Uplink RRC Transfer message may include a new identity for the access node 720B' (e.g., a new C-RNTI).

At step 726, the target BS 710B' may determine whether the target BS 710B' has the UE context of the access node 720B' or not. For example, the target BS 710B' may determine whether the received old C-RNTI of the access node 720B' and the received old PCI of the source serving cell of the access node 720B' match a UE context previously transmitted to the target BS 710B'. If there is a match, the target BS 710B' may determine that the target BS 710B' has the UE context of the access node 720B'.

Referring back to FIG. 7A, for example, at step 702 or 714, the target BS 710B may receive the UE context of the downstreaming nodes of the IAB node 720A and the UE context of the UEs directly or indirectly connected to the IAB node 720A. At step 716, the target BS 710B may receive an old C-RNTI of the access node 720B and a PCI of a source serving cell of the access node 720B (e.g., the old PCI of IAB node 720A). The target BS 710B may determine that the target BS 710B has the UE context of the access node 720B based on the old C-RNTI of the access node 720B and the old PCI of IAB node 720A matching one of the UE context received at step 702 or 714.

Referring to FIG. 7B, at step 728, the target BS 710B' may transmit a UE Context Setup Request message to the IAB node 720A' to create a UE context for access node 720B'. At step 732, the IAB node 720A' may respond to the target BS 710B' with a UE Context Setup Response message. At step 734, the target BS 710B' may transmit a Downlink RRC Transfer message including a RRC connection reestablishment message to the IAB node 720A'.

At step 736, the IAB node 720A' may transmit a RRC Connection Reestablishment message to the access node 720B'. At step 738, the access node 720B' may transmit a RRC Connection Reestablishment Complete message to the IAB node 720A'. At step 742, the IAB node 720A' may transmit an Uplink RRC Transfer message to convey the RRC Connection Reestablishment Complete message to the target BS 710B'.

Referring to FIG. 7C, at step 752, the access node 720B" sends a RRC Connection Reestablishment Request message to the IAB node 720A". In some embodiments, the RRC Connection Reestablishment Request message may indicate an old identity of the access node 720B" and an old identity of a source serving cell of the access node 720B". For example, the RRC Connection Reestablishment Request message may include an old C-RNTI of the access node 720B" and an old PCI of a source serving cell of the access node 720B" (e.g., the old PCI of IAB node 720A").

In some embodiments of the present disclosure, the access node 720B" is an IAB node. In some embodiments of the present disclosure, the RRC Connection Reestablishment Request message may indicate the cell identity of the access node 720B". The cell identity of the access node 720B" may be a PCI of the access node 720B". In some embodiments of the present disclosure, the RRC Connection Reestablishment Request message may include an identity of the DU of the access node 720B".

At step 754, the IAB node 720A" may transmit an initial Uplink RRC Transfer message to the target BS 710B" to convey the RRC Connection Reestablishment Request message. The initial Uplink RRC Transfer message may include a new identity for the access node 720B" (e.g., a new C-RNTI).

At step 756, the target BS 710B" may determine whether the IAB node 720A" has the UE context of the access node 720B' or not. For example, the target BS 710B" may determine whether the old PCI of the source serving cell of the access node 720B" matches the old cell identity (e.g., the old PCI) of the IAB node 720A" previously transmitted to the target BS 710B". If there is a match, the target BS 710B" may determine that the IAB node 720A" has the UE context of the access node 720B".

Referring back to FIG. 7A, for example, at step 702 or 714, the target BS 710B may receive the old PCI of the IAB node 720A. At step 716, the target BS 710B may receive a PCI of a source serving cell (i.e., the IAB node 720A)) of the access node 720B. The target BS 710B may determine that the IAB node 720A has the UE context of the access node 720B based on the PCI of the source serving cell of the access node 720B is the same as the old PCI of IAB node 720A received at step 702 or 714.

At step 758, the target BS 710B" may transmit a Downlink RRC Transfer message including a RRC connection reestablishment message and an old DU F1AP UE ID associated with the access node 720B" to the IAB Node 720A". At step 762, the IAB Node 720A" may retrieve the corresponding UE context of the access node 720B" based on the old DU F1AP UE ID stored at the IAB Node 720A". The IAB Node 720A" may replace old C-RNTI and old PCI in the retrieved UE context with new C-RNTI and new PCI.

At step 764, the IAB Node 720A" may transmit a RRC Connection Reestablishment message to the access node 720B". At step 766, the access node 720B" may transmit a RRC Connection Reestablishment Complete message to the IAB node 720A". At step 768, the IAB node 720A" may transmit an Uplink RRC Transfer message to convey the RRC Connection Reestablishment Complete message to the target BS 710B".

Figure 8:
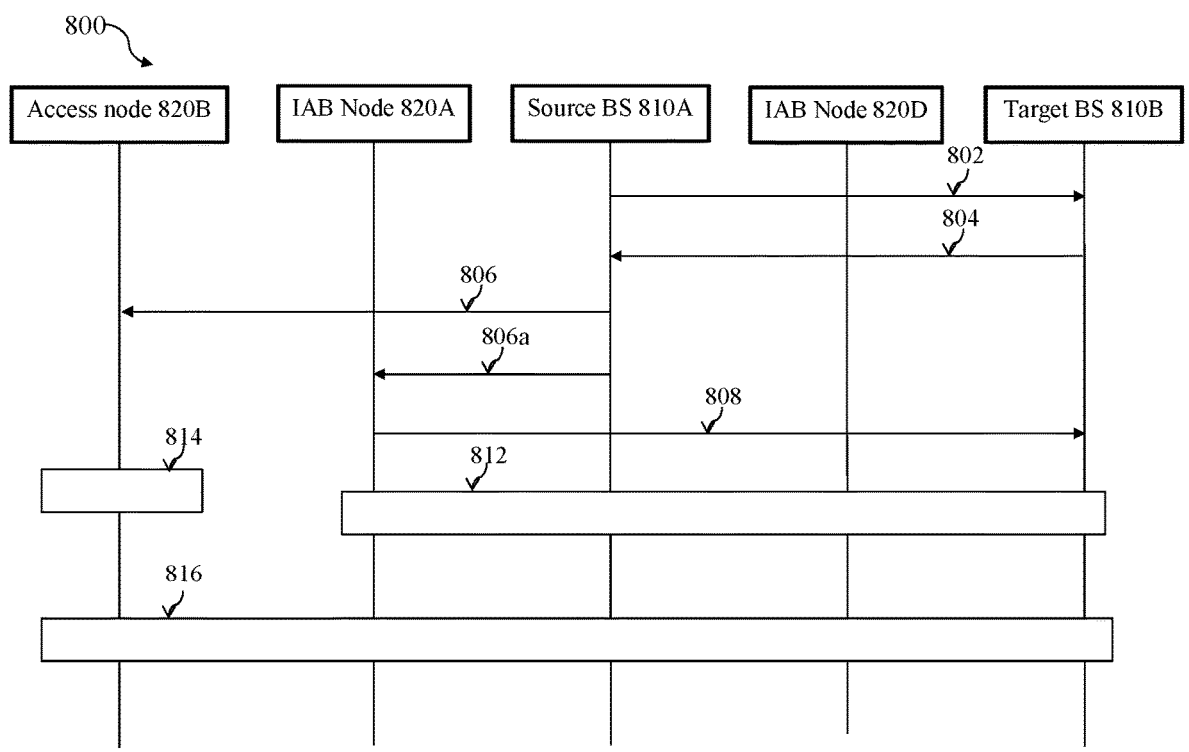
FIG. 8 illustrates a flow chart of an exemplary handover procedure according to an embodiment of the present disclosure.

FIG. 8 shows a flow chart of an exemplary handover procedure 800 according to an embodiment of the present disclosure.

In FIG. 8, IAB node 820A is accessing a source BS 810A. Access node 820B is a downstream node of IAB node 820A, a UE served by IAB node 820A, or a UE served by one of the downstream nodes of IAB node 820A. In other words, the access node 820B is accessing the source BS 810A via the IAB node 820A. IAB node 820D is accessing a target BS 810B. The IAB node 820A and IAB node 820D may include respective MTs and DUs (not shown).

For example, the IAB node 820A may function as IAB node 520A shown in FIG. 5, and the IAB node 820D may function as IAB node 520D shown in FIG. 5. The access node 820B may function as one of IAB node 520B, IAB node 520C, UE 530A, UE 530B, and UE 530C shown in FIG. 5. The source BS 810A may function as the IAB donor 510A shown in FIG. 5, and the target BS 810B may function as the IAB donor 510B shown in FIG. 5.

The procedure 800 also includes three phases, i.e., Phase 1: a handover procedure for MT of IAB node 820A; Phase 2: a DU setup procedure for IAB node 820A; and Phase 3: a handover procedure for the access node 820B. Phase 1 is described with respect to steps 802-808, Phase 2 is described with respect to step 812, and Phase 3 is described with respect to steps 814 and 816.

Similarly to step 702 in FIG. 7A, at step 802, the source BS 810A may transmit a Handover Request message to a target cell (e.g., the target BS 810B) to initiate a handover procedure for an IAB node (e.g., IAB node 820A). In some embodiments, the Handover Request message may include assistant information for reestablishing a link for at least one access nodes associated with the IAB node 820A (e.g., the access node 820B). The definition of the Handover Request message and the assistant information is similar to the one described above with respect to FIG. 7A, and thus is omitted herein.

After receiving the Handover Request message, the target BS 810B may perform admission control. The target BS 810B may allocate a new cell identity (e.g., PCI) to the IAB node 820A. At step 804, the target BS 810B may transmit a Handover Request Acknowledgement message including RRC configuration to the source BS 810A.

At step 806, the source BS 810A may transmit a RRC Reconfiguration message to the access node 820B. At step 806a, the source BS 810A may transmit a RRC Reconfiguration message to the IAB node 820A. In some embodiments, step 806 may occur prior to step 806a. In other words, the RRC Reconfiguration message to the access node 820B may be transmitted prior to the transmission of the RRC Reconfiguration message to the IAB node 820A.

After receiving the RRC Reconfiguration message, the IAB node 820A may move the RRC connection to the target BS 810B. At step 808, the IAB node 820A may transmit a Handover Complete message to the target BS 810B. At step 812, the IAB node 820A may perform a DU setup procedure and may establish a connection with the CU of the target BS 810B.

In some embodiments of the present disclosure, during the DU setup procedure, information indicating an identity of the MT of the IAB node 820A may be transmitted to the target BS 810B. For example, information indicating the identity of the MT of the IAB node 820A may be transmitted to the target BS 810B. The identity of a MT may be a MT ID.

In some embodiments of the present disclosure, instead of providing the assistant information in the Handover Request message, the assistant information may be transmitted via F1 signaling after the completion of the setup of the DU of the IAB node 820A. In some embodiments of the present disclosure, the assistant information may be transmitted during the DU setup procedure. The definition of the assistant information is similar to the one described above with respect to FIG. 7A, and thus is omitted herein.

In some embodiments of the present disclosure, the RRC Reconfiguration message transmitted to the access node 820B at step 806 may include assistant information for handing over at least one access nodes associated with the IAB node 820A (e.g., the access node 820B).

In some embodiments of the present disclosure, the handover assistant information may include a value of a timer associated with the access node 820B. The timer may be started upon receiving the RRC Reconfiguration message at the access node 820B. In these embodiments, the access node 820B may, at step 814, determine whether the timer associated with the access node 820B has expired. If it is determined that the timer has expired, the access node 820B may, at step 816, perform a handover procedure. The access node 820B may access to the target BS 810B via IAB node 820A after the completion of the handover procedure.

In some embodiments of the present disclosure, the Handover Request ACK message transmitted to the source BS 810A at step 804 may include a cell identity (e.g., PCI) of a target IAB node. In these embodiments, the handover assistant information may include the cell identity of the target IAB node (e.g., the new cell identity of the IAB node 820A). The access node 820B may, at step 814, initiate a procedure for discovering a neighboring cell having an identity matching the cell identity of the target IAB node. The access node 820B may, at step 816, perform a handover procedure if a neighboring cell having the target cell identity (e.g., the IAB node 820A) is discovered. The access node 820B will access to the target BS 810B via the target IAB node (e.g., the IAB node 820A) after the completion of the handover procedure.

Figure 9A:
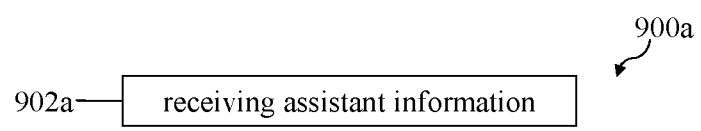
FIG. 9A illustrates a flow chart of an exemplary procedure of receiving assistant information according to an embodiment of the present disclosure.

FIG. 9A illustrates a flow chart of an exemplary procedure 900a of receiving assistant information according to an embodiment of the present disclosure. In some embodiments of the present disclosure, the procedure in FIG. 9A may be applied to FIGS. 5, 6 and 7A-7C. For example, the procedure in FIG. 9A may be performed by the IAB donors in FIG. 5 or the target BS in FIGS. 6 and 7A-7C.

At step 902a, a BS may receive assistant information for reestablishing a link for at least one access node associated with an IAB node. In some embodiments, the assistant information is received at a CU of the BS. For example, referring back to FIG. 5, the CU 511B may receive assistant information for reestablishing a link for at least one access node associated with an IAB node (e.g., IAB node 520A). The at least one access node associated with IAB node 520A may include the downstream nodes of IAB node 520A (e.g., IAB node 520B and IAB node 520C), and the UEs directly or indirectly connected to the IAB node 520A (e.g., UE 530A, UE 530B, and UE 530C).

In some embodiments of the present disclosure, the assistant information may include UE context of downstreaming nodes of the IAB node, UE context of UE connected to the IAB node, and UE context of UE connected to the downstreaming nodes of the IAB node. In some embodiments of the present disclosure, the BS may receive a message including an identity of a first node (e.g., a C-RNTI of the first node) among the at least one access node and an identity of a source serving cell of the first node (e.g., a PCI of the source serving cell). The BS may determine that the BS has UE context of the first node based on the identity of the first node and the identity of the source serving cell of the first node matching a UE context in the assistant information. In some embodiments of the present disclosure, in the case that the first node is an IAB node, the message may include an identity of a DU of the first node. For example, the first node may be IAB node 520B in FIG. 5.

In some embodiments of the present disclosure, the assistant information may include a cell identity of the IAB node. In some embodiments of the present disclosure, the cell identity may include a physical cell identity of the IAB node. In some embodiments of the present disclosure, the BS may receive a message including an identity of a source serving cell of a first node (e.g., a PCI of the source serving cell) among the at least one access node. The BS may determine that the IAB node has UE context of the first node based on the identity of the source serving cell matches the cell identity of the IAB node. In some embodiments of the present disclosure, in the case that the first node is an IAB node, the message further may include a cell identity of the first node or an identity of a DU of the first node.

In some embodiments of the present disclosure, the assistant information may be received via a handover request message for a MT of the IAB node. In some embodiments of the present disclosure, the handover request message may include an identity of a DU of the IAB node.

In some embodiments of the present disclosure, the assistant information may be received via F1 signaling after completion of a setup of a DU of the IAB node. In some embodiments of the present disclosure, the BS may receive an identity of a MT of the IAB node during the setup of the DU.

Figure 9B:
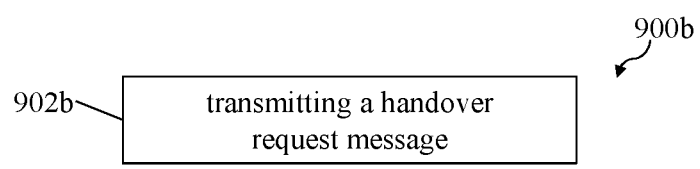
FIG. 9B illustrates a flow chart of an exemplary procedure of transmitting assistant information according to an embodiment of the present disclosure.

FIG. 9B illustrates a flow chart of an exemplary procedure 900b of transmitting assistant information according to an embodiment of the present disclosure. In some embodiments of the present disclosure, the procedure in FIG. 9B may be applied to FIGS. 5, 6 and 7A-7C. For example, the procedure in FIG. 9B may be performed by the IAB donors in FIG. 5 or the source BS in FIGS. 6 and 7A-7C.

At step 902b, a BS may transmit a handover request message for an IAB node. In some embodiments of the present disclosure, the handover request message may include assistant information for reestablishing a link for at least one access node associated with the IAB node. In some embodiments, the assistant information is transmitted by a CU of the BS.

For example, referring back to FIG. 5, the CU 511A may transmit assistant information for reestablishing a link for at least one access node associated with an IAB node (e.g., IAB node 520A). The at least one access node associated with IAB node 520A may include the downstream nodes of IAB node 520A (e.g., IAB node 520B and IAB node 520C), and the UEs directly or indirectly connected to the IAB node 520A (e.g., UE 530A, UE 530B, and UE 530C).

In some embodiments of the present disclosure, the assistant information may include UE context of downstreaming nodes of the IAB node, UE context of UE connected to the IAB node, and UE context of UE connected to the downstreaming nodes of the IAB node. In some embodiments of the present disclosure, the assistant information may include a cell identity of the IAB node (e.g., a PCI of the IAB node).

In some embodiments of the present disclosure, the handover request message may request handing over a MT of the IAB node. In some embodiments of the present disclosure, the handover request message may include an identity of a DU of the IAB node.

Figure 9C:
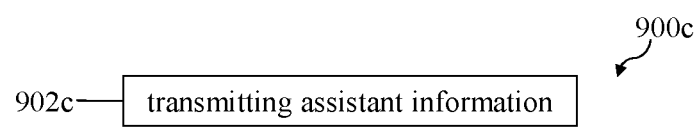
FIG. 9C illustrates a flow chart of an exemplary procedure of transmitting assistant information according to an embodiment of the present disclosure.

FIG. 9C illustrates a flow chart of an exemplary procedure 900c of transmitting assistant information according to an embodiment of the present disclosure. In some embodiments of the present disclosure, the procedure in FIG. 9C may be applied to FIGS. 5, 6 and 7A-7C. For example, the procedure in FIG. 9C may be performed by an IAB node in FIGS. 5, 6 and 7A-7C.

At step 902c, an IAB node may transmit assistant information for reestablishing a link for at least one access node associated with the IAB node. For example, referring back to FIG. 5, IAB node 520A may transmit assistant information for reestablishing a link for at least one access node associated with the IAB node 520A. The at least one access node associated with IAB node 520A may include the downstream nodes of IAB node 520A (e.g., IAB node 520B and IAB node 520C), and the UEs directly or indirectly connected to the IAB node 520A (e.g., UE 530A, UE 530B, and UE 530C).

In some embodiments of the present disclosure, the assistant information may be transmitted via F1 signaling.

In some embodiments of the present disclosure, the assistant information may include UE context of downstreaming nodes of the IAB node, UE context of UE connected to the IAB node, and UE context of UE connected to the downstreaming nodes of the IAB node. In some embodiments of the present disclosure, the assistant information may include a cell identity of the IAB node (e.g., a PCI of the IAB node).

In some embodiments of the present disclosure, the IAB node may transmit an identity of a MT of the IAB node. In some embodiments of the present disclosure, the IAB node may receive a message including a cell identity of the at least one access node or an identity of a DU of the at least one access node. In some embodiments of the present disclosure, the IAB node may retrieve UE context of the at least one access node at the IAB node.

Figure 10A:
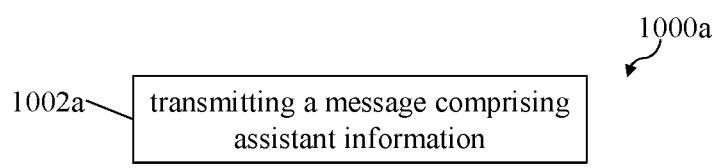
FIG. 10A illustrates a flow chart of an exemplary procedure of transmitting assistant information according to an embodiment of the present disclosure.

FIG. 10A illustrates a flow chart of an exemplary procedure 1000a of transmitting assistant information according to an embodiment of the present disclosure. In some embodiments of the present disclosure, the procedure in FIG. 10A may be applied to FIGS. 5, 6 and 8. For example, the procedure in FIG. 10A may be performed by the IAB donors in FIG. 5 or the source BS in FIGS. 6 and 8.

At step 1002a, a BS may transmit a message including assistant information for handing over an access node associated with an IAB node. In some embodiments, the assistant information is transmitted by a CU of the BS.

For example, referring back to FIG. 5, the CU 511A may transmit a message including assistant information for handing over an access node associated with an IAB node (e.g., IAB node 520A). The access node associated with the IAB node 520A may be one of the downstream nodes of IAB node 520A (e.g., IAB node 520B and IAB node 520C), and the UEs directly or indirectly connected to the IAB node 520A (e.g., UE 530A, UE 530B, and UE 530C).

In some embodiments of the present disclosure, the assistant information may include a value of a timer associated with the access node.

In some embodiments of the present disclosure, the assistant information may include a cell identity used to identify a target IAB node. In some embodiments of the present disclosure, the BS may receive the cell identity of the target IAB node. For example, the cell identity may include a physical cell identity (PCI).

Figure 10B:
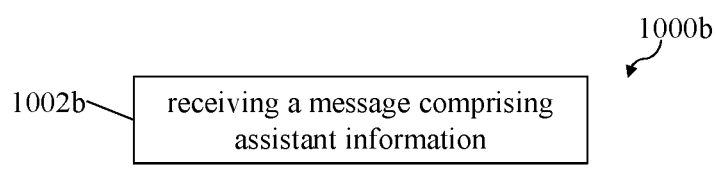
FIG. 10B illustrates a flow chart of an exemplary procedure of receiving assistant information according to an embodiment of the present disclosure.

FIG. 10B illustrates a flow chart of an exemplary procedure 1000b of receiving assistant information according to an embodiment of the present disclosure. In some embodiments of the present disclosure, the procedure in FIG. 10B may be applied to FIGS. 5, 6 and 8. For example, the procedure in FIG. 10B may be performed by an IAB node or a UE in FIGS. 5, 6 and 8.

At step 1002b, an access node may receive a message including assistant information for handing over the access node. For example, referring back to FIG. 5, the access node may be one of the downstream nodes of IAB node 520A (e.g., IAB node 520B and IAB node 520C), and the UEs directly or indirectly connected to the IAB node 520A (e.g., UE 530A, UE 530B, and UE 530C).

In some embodiments of the present disclosure, the assistant information may include a value of a timer associated with the access node. In some embodiments of the present disclosure, the access node may start the timer in response to receiving the message, and may perform a handover procedure in response to an expiry of the timer.

In some embodiments of the present disclosure, the assistant information may include a cell identity. For example, the cell identity may include a physical cell identity (e.g., PCI). In some embodiments of the present disclosure, the access node may perform a handover procedure in response to discovering a node having an identity matching the cell identity.

Figure 11:
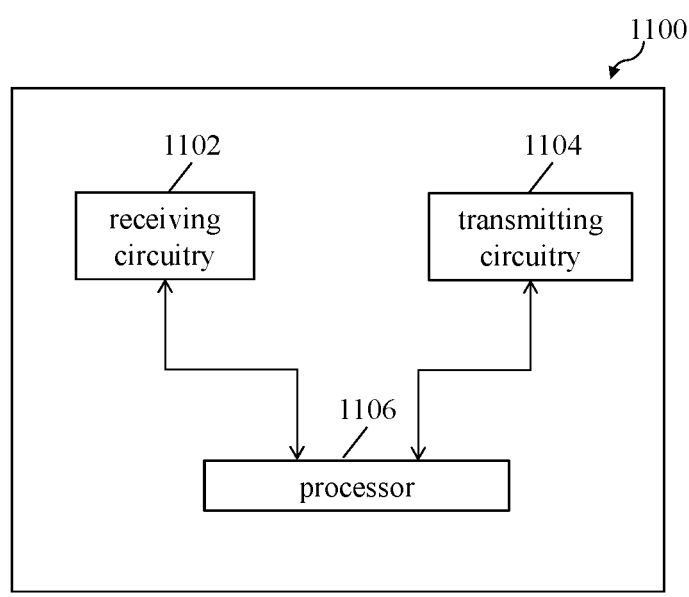
FIG. 11 illustrates an example block diagram of an apparatus according to an embodiment of the present disclosure.

FIG. 11 illustrates an example block diagram of an apparatus 1100 according to an embodiment of the present disclosure.

As shown in FIG. 11, the apparatus 1100 may include at least one non-transitory computer-readable medium (not shown), a receiving circuitry 1102, a transmitting circuitry 1104, and a processor 1106 coupled to the non-transitory computer-readable medium (not shown), the receiving circuitry 1102 and the transmitting circuitry 1104. The apparatus 1100 may be a BS or an access node. In some embodiments, the apparatus 1100 is an IAB donor. In some other embodiments, the apparatus 1100 is an IAB node or a UE.

Although in this figure, elements such as processor 1106, transmitting circuitry 1104, and receiving circuitry 1102 are described in the singular, the plural is contemplated unless limitation to the singular is explicitly stated. In some embodiments of the present disclosure, the receiving circuitry 1102 and the transmitting circuitry 1104 are combined into a single device, such as a transceiver. In certain embodiments of the present disclosure, the apparatus 1100 may further include an input device, a memory, and/or other components.

In some embodiments of the present disclosure, the non-transitory computer-readable medium may have stored thereon computer-executable instructions to cause a processor to implement the method with respect to the communication node as described above. For example, the computer-executable instructions, when executed, cause the processor 1106 interacting with receiving circuitry 1102 and transmitting circuitry 1104, so as to perform the steps with respect to the BS depicted in FIGS. 5-8, 9A, 9B, and 10A.

In some embodiments of the present disclosure, the non-transitory computer-readable medium may have stored thereon computer-executable instructions to cause a processor to implement the method with respect to the BS as described above. For example, the computer-executable instructions, when executed, cause the processor 1106 interacting with receiving circuitry 1102 and transmitting circuitry 1104, so as to perform the steps with respect to IAB node or UE depicted in FIGS. 5-8, 9C, and 10B.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

The following is what is claimed:

1. A method performed at a network device, the method comprising:
   transmitting a handover request message for an integrated access and backhaul node, wherein the handover request message comprises assistant information for reestablishing a link for at least one access node associated with the integrated access and backhaul node, and wherein the handover request message comprises an information element (IE) that includes the assistant information, and wherein the assistant information within the IE comprises:
      user equipment (UE) context of downstreaming nodes of the integrated access and backhaul node, UE connected to the integrated access and backhaul node, and UE connected to the downstreaming nodes of the integrated access and backhaul node; and
      a cell identity of the integrated access and backhaul node.

2. The method of claim 1, further comprising:
   receiving, at a base station, the assistant information.

3. The method of claim 2, wherein the assistant information is received via a handover request message for a mobile termination of the integrated access and backhaul node and via F1 signaling after completion of a setup of a distributed unit of the integrated access and backhaul node, and the handover request message comprises an identity of a distributed unit of the integrated access and backhaul node.

4. The method of claim 3, further comprising:
   receiving an identity of a mobile termination of the integrated access and backhaul node during the setup of the distributed unit.

5. The method of claim 2, further comprising:
   receiving a message comprising an identity of a first node of the at least one access node and an identity of a source serving cell of the first node; and
   determining that the base station has user equipment context of the first node based on the identity of the first node and the identity of the source serving cell of the first node matching the user equipment context.

6. The method of claim 5, wherein the first node is an integrated access and backhaul node, and the message further comprises an identity of a distributed unit of the first node.

7. The method of claim 1, further comprising:
   receiving a message comprising an identity of a source serving cell of a first node of the at least one access node; and
   determining that the integrated access and backhaul node has user equipment context of the first node based on the identity of the source serving cell matches the cell identity of the integrated access and backhaul node.

8. The method of claim 1, wherein the assistant information comprises user equipment context of downstreaming nodes of the integrated access and backhaul node, user equipment connected to the integrated access and backhaul node, and user equipment connected to the downstreaming nodes of the integrated access and backhaul node, or the assistant information comprises a cell identity of the integrated access and backhaul node.

9. The method of claim 1, wherein the handover request message further comprises an identity of a distributed unit of the integrated access and backhaul node.

10. The method of claim 1, further comprising:
    transmitting a message comprising assistant information for handing over an access node associated with an integrated access and backhaul node.

11. The method of claim 10, wherein the assistant information comprises a value of a timer associated with the access node and a cell identity used to identify a target integrated access and backhaul node.

12. The method of claim 11, further comprising:
    receiving the cell identity of the target integrated access and backhaul node.

13. The method of claim 11, wherein the cell identity comprises a physical cell identity.

14. A method performed at a network device, the method comprising:
    transmitting assistant information for reestablishing a link for at least one access node associated with an integrated access and backhaul node, wherein the assistant information is transmitted via F1 signaling, and wherein an information element (IE) includes the assistant information, and wherein the assistant information within the IE comprises:
- user equipment (UE) context of downstreaming nodes of the integrated access and backhaul node, UE connected to the integrated access and backhaul node, and UE connected to the downstreaming nodes of the integrated access and backhaul node; and
- a cell identity of the integrated access and backhaul node.

15. The method of claim 14, wherein the assistant information comprises user equipment context of downstreaming nodes of the integrated access and backhaul node, user equipment connected to the integrated access and backhaul node, and user equipment connected to the downstreaming nodes of the integrated access and backhaul node or the assistant information comprises a cell identity of the integrated access and backhaul node.

16. The method of claim 14, further comprising:
- transmitting an identity of a mobile termination of the integrated access and backhaul node;
- receiving a message comprising a cell identity of the at least one access node or an identity of a distributed unit of the at least one access node; and
- retrieving user equipment context of the at least one access node.

17. A method performed at a network device, the method comprising:
- receiving a message comprising assistant information for handing over an access node, wherein the message comprises an information element (IE) that includes the assistant information, and wherein the assistant information within the IE comprises:
  - user equipment (UE) context of downstreaming nodes of an integrated access and backhaul node, UE connected to the integrated access and backhaul node, and UE connected to the downstreaming nodes of the integrated access and backhaul node; and
  - a cell identity of the integrated access and backhaul node.

18. The method of claim 17, further comprising:
starting a timer in response to receiving the message; and
performing a handover procedure in response to an expiry of the timer;
wherein the assistant information comprises a value of the timer, wherein the timer is associated with the access node.

19. The method of claim 17, further comprising:
performing a handover procedure in response to discovering a node having an identity matching a cell identity;
wherein the assistant information comprises the cell identity.

20. A network device, comprising:
at least one memory; and
at least one processor coupled with the at least one memory and configured to cause the network device to:
- transmit a handover request message for an integrated access and backhaul node,
  - wherein the handover request message comprises assistant information for reestablishing a link for at least one access node associated with the integrated access and backhaul node, and wherein the handover request message comprises an information element (IE) that includes the assistant information, and wherein the assistant information within the IE comprises:
    - user equipment (UE) context of downstreaming nodes of the integrated access and backhaul node, UE connected to the integrated access and backhaul node, and UE connected to the downstreaming nodes of the integrated access and backhaul node; and
    - a cell identity of the integrated access and backhaul node.

* * * * *